United States Patent [19]

Levy et al.

[11]  4,264,157
[45]  Apr. 28, 1981

[54] METHOD AND APPARATUS FOR MANUFACTURING MASKED MOTION PICTURE FILM FOR SIMULATED TARGET PRACTICE

[75] Inventors: Marilyn Levy, Little Silver; Seymour L. Hersh, Freehold, both of N.J.

[73] Assignee: The United States of America as represented by the Secretary of the Army, Washington, D.C.

[21] Appl. No.: 40,376

[22] Filed: May 18, 1979

[51] Int. Cl.³ ............................................. G03B 21/32
[52] U.S. Cl. ...................................... 352/85; 352/39; 352/87; 352/92
[58] Field of Search ....................... 352/39, 46, 51, 55, 352/56, 92, 85, 87, 52

[56] References Cited

U.S. PATENT DOCUMENTS

| | | | |
|---|---|---|---|
| 1,595,627 | 8/1926 | Seymour | 352/85 |
| 2,028,975 | 1/1936 | Gillette | 352/46 |
| 2,392,142 | 1/1946 | Gosswiller | 352/39 |
| 2,449,030 | 9/1948 | Wilsey | 352/39 |
| 3,533,688 | 10/1970 | Painton | 352/92 |
| 3,556,646 | 1/1971 | Guidi et al. | 352/52 |
| 3,888,022 | 6/1975 | Pardes et al. | 35/25 |

Primary Examiner—Monroe H. Hayes
Attorney, Agent, or Firm—Nathan Edelberg; Jeremiah G. Murray; Daniel D. Sharp

[57] ABSTRACT

A scene containing one or more targets for simulated target practice is photographed in a special motion picture camera such that only one half of each frame is exposed. After reversal development, a transparent template having two sets of aligned, spaced-apart cross-hairs is positioned over the film such that the upper set of cross-hairs is aligned with one of the recorded targets. Then, using the lower pair of cross-hairs as a guide, a pin-hole is punched in the unexposed i.e. opaque portion of the frame. This action is repeated for every frame in the film, altering the size of the dot as need be, as the target moves towards or away from the camera.

3 Claims, 7 Drawing Figures

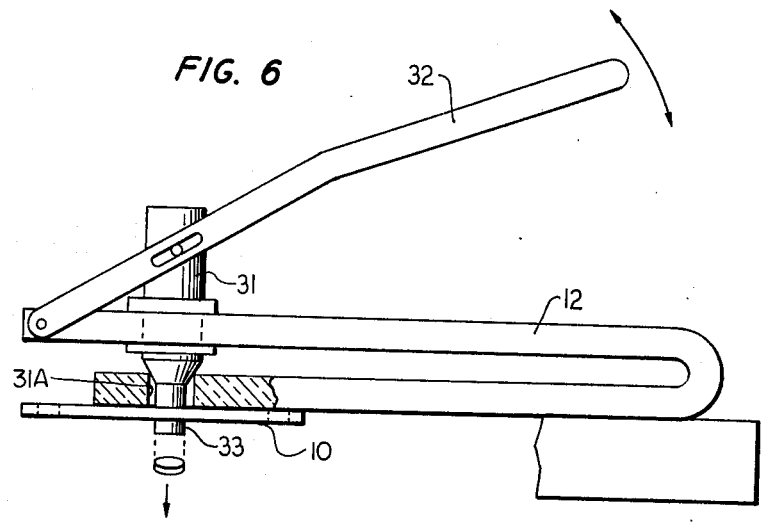
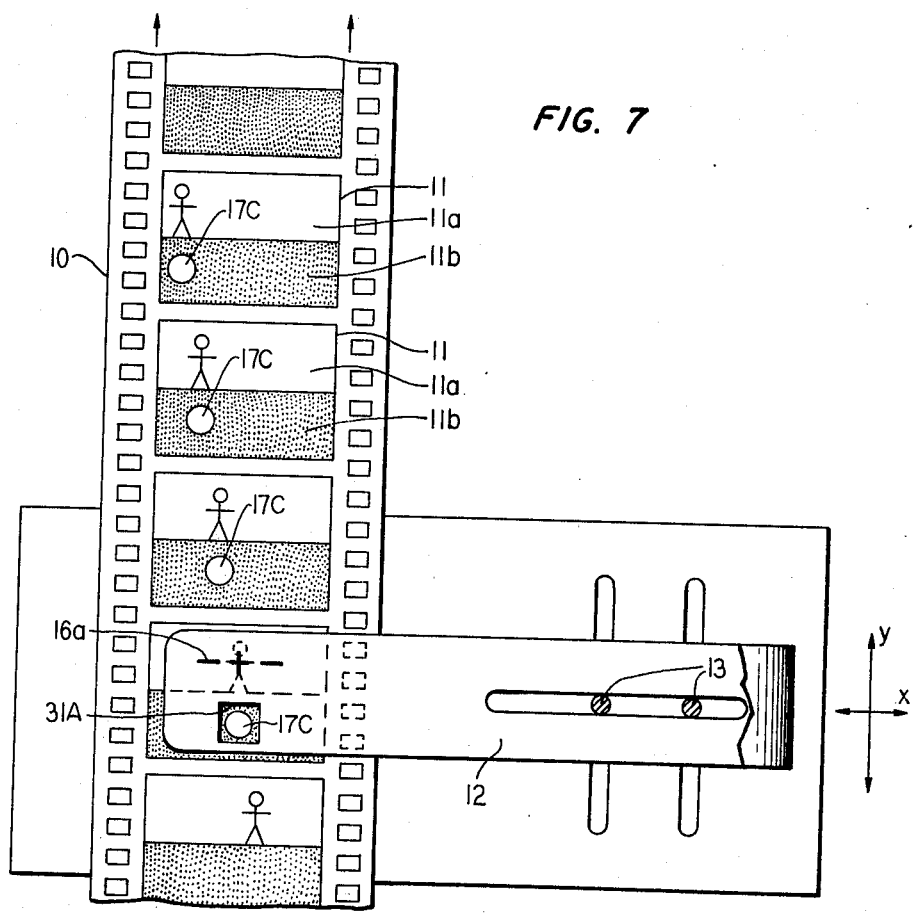

METHOD AND APPARATUS FOR MANUFACTURING MASKED MOTION PICTURE FILM FOR SIMULATED TARGET PRACTICE

GOVERNMENT LICENSE

The invention described herein may be manufactured and used by or for the Government, for governmental purposes, without the payment of any royalties thereon or therefor.

BACKGROUND OF THE INVENTION (a) Field of the Invention

Broadly speaking, this invention relates to simulated target-training. More particularly, in a preferred embodiment, this invention relates to methods and apparatus for manufacturing motion pictures for use in projection apparatus used in a target practice simulator.

(b) Discussion of the Prior Art

As is well known, the aquisition and maintenance of a high level of skill and markmanship in the use of small arms, such as rifles and pistols, requires frequent practice on the firing range. Recently, it has been found more efficient, and considerably less expensive, to conduct such target practice on a simulated firing range. In one known system, for example, the system disclosed in U.S. Pat. No. 3,888,022 which issued on June 10th, 1975 to H. Pardes et al. and which is assigned to the United States of America as represented by the Secretary of the Army, a motion picture of a target-bearing scene is projected onto a screen. The subject aims at the target with a simulated weapon and fires; however, instead of a bullet, the simulated weapon "shoots" a laser beam at the target. The laser beam is reflected off the screen, back into the projector's optics, where it is imaged onto the lower half of the film, being projected. This film has priorly been prepared such that an aperture appears on the lower half of the film, which aperture is advantageously clear, and in exact alignment with the target on the screen. If the subject has aimed his "rifle" accurately, so that the laser beam registers a "hit" on the screen, the reflected beam will pass through the aperture in the film to be detected by some suitable photodetector. Obviously, as the target moves about on the screen, the aperture in the lower half of the film will move also. Further, as the target advances or retreats on the screen, the aperture will grow larger or smaller in the same proportion.

Heretofore, such special motion pictures were expensive and time-consuming to manufacture. Typically, they were made by photographing the target-bearing scene in a motion picture camera including a mask such that the scene is recorded on only the upper half of the film. After reversal processing, the film is projected onto a screen so that the top half of the screen contains the picture and the bottom half is dark. A white spot of the correct size is then manually positioned on the lower half of the screen, using a pantograph, for example, so that the white spot is located in the same relative position as the target of interest on the upper half of the screen.

The entire screen, including the photographic scene and the image of the aperture mask, is then re-photographed so that, after processing, if the two halves of the film are superimposed, only the target would appear through the aperture in the mask.

This mask positioning operation and the re-photographing of the combined image is repeated, frame by frame, each time positioning the mask spot at the proper location on the screen.

It goes without saying, that the above-described process is slow and tedious; worse than that, it results in a master training film that is of poor photographic quality because it is a second generation image obtained by photographing an image that has been projected on a screen.

SUMMARY OF THE INVENTION

It is accordingly an object of this invention to produce a master training film of high optical quality using a process which is more efficient and less expensive than those heretofore employed.

In a first preferred embodiment, the target scene is photographed using negative film and the aperture mask produced by selectively placing opaque dots on the clear, unexposed portions of the negative. The negative is then contact printed on a transparent photographic emulsion to produce a reversal transparency print. In a second preferred embodiment, the target scene is photographed on reversal film and the apertured mask produced by physically punching holes in the opaqued area of the masked frame.

The invention and its mode of operation will be more fully understood from the following detailed description, when taken with the appended drawings, in which:

DESCRIPTION OF THE DRAWINGS

FIGS. 6 and 7 are respectively plan and cross-sectional views of an embodiment of the invention for use with reversal film.

DETAILED DESCRIPTION OF THE INVENTION

Figure 1:
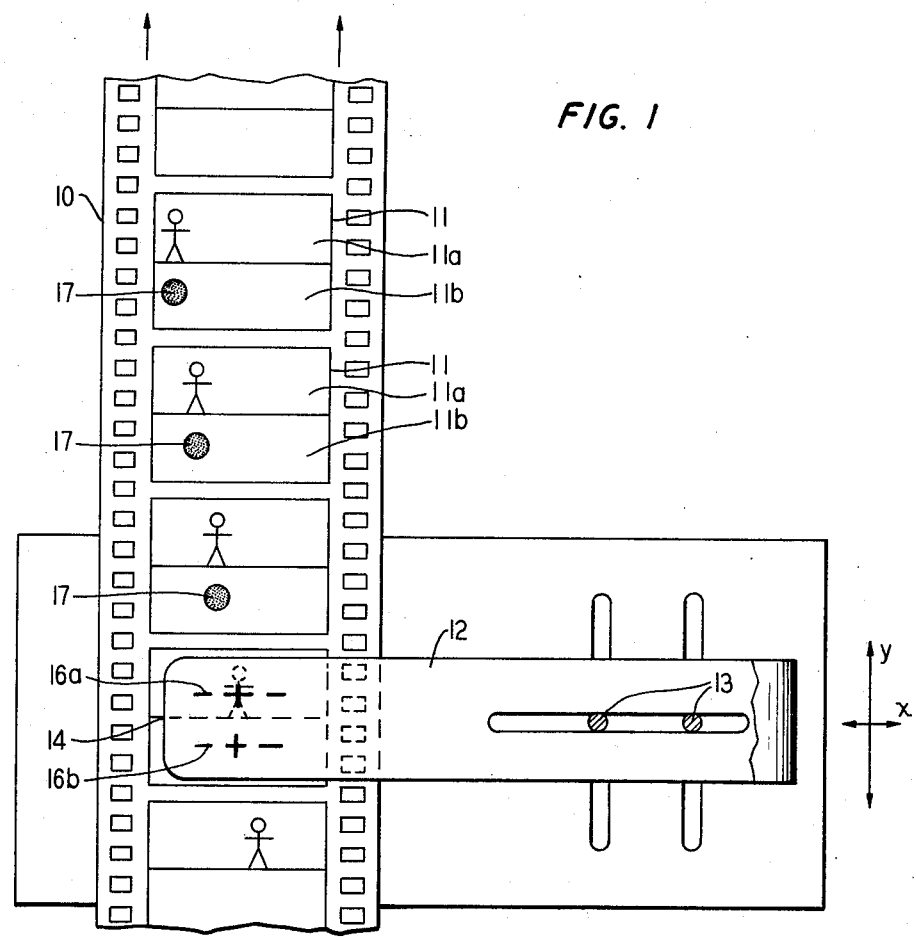
FIG. 1 is a top view of a film masking apparatus according to the invention for use with negative film.

Referring to FIG. 1, the numeral 10 represents a strip of perforated 35 mm negative film including a plurality of frames 11. The film may be monochrome or color and, obviously, the film is not restricted to 35 mm, but maybe any of the other known widths such as 8 mm, 16 mm or 70 mm.

Each frame is divided into an upper portion 11a and a lower portion 11b. As previously mentioned, film 10 is exposed in a special camera so that only the upper half 11a of each frame contains the target-bearing scene and the lower half 11b is unexposed, hence transparent, on the negative.

With the film retained in some conventional film transport mechanism, such as an editor, the apparatus used to make the mask comprises a transparent glass or plastic member 12 pivoted at 13 for translation along either the X or Y axis or both. Member 12 is positioned such that the extremity 14 thereof overlays one of the frames 11. Extremity 14 has a pair of cross-hairs 16a and 16b formed thereon.

In use, film 10 is illuminated from the rear and cross-hairs 16a moved over upper frame-half 11a until they coincide with the desired target in the scene. Then, using cross-hairs 16b as a reference, an opaque dot 17 of an appropriate size is adhered to the lower frame-half 11b. If the scene photographed contains multiple targets, this procedure is repeated for each target; if not, the film is advanced to the next frame and the procedure repeated. Next, a positive print is made from the negative and, as desired, the lower half of each frame in the film will comprise an opaque mask with transparent dots therein which align precisely with the targets in the upper portion of the frame.

Figure 2:
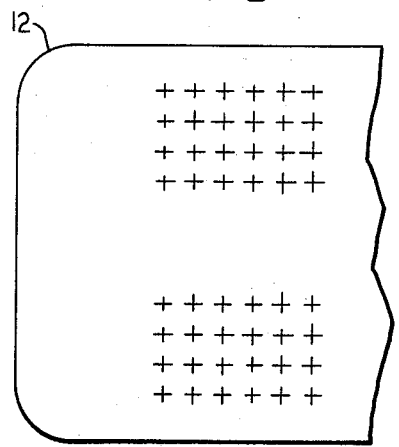
FIGS. 2 and 3 are plan views showing two alternate forms of indicia for the apparatus shown in FIG. 1.
Figure 3:
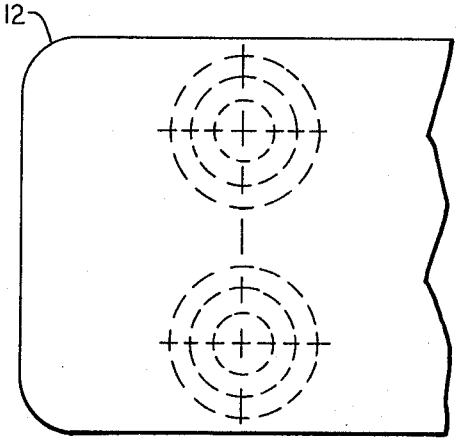

As shown in FIGS. 2 and 3, if desired, a ruled reticle or a series of concentric circles may be added to member 12 to aid in accurately determining the size of the dot desired for a particular target.

Figure 4:
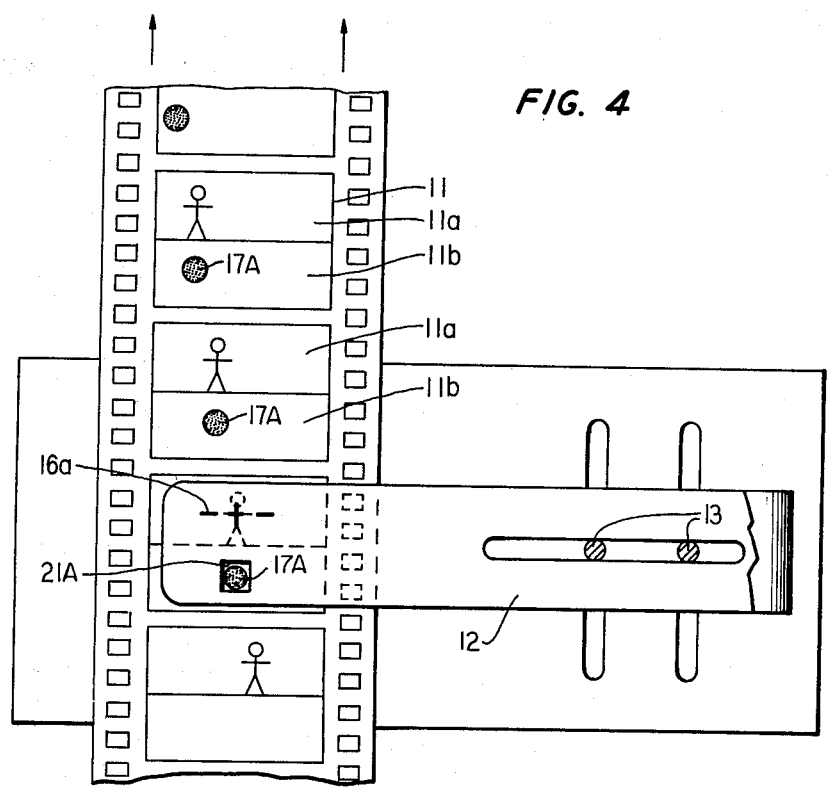
FIGS. 4 and 5 are respectively plan and cross-sectional views of another embodiment of the invention shown in FIG. 1.
Figure 5:
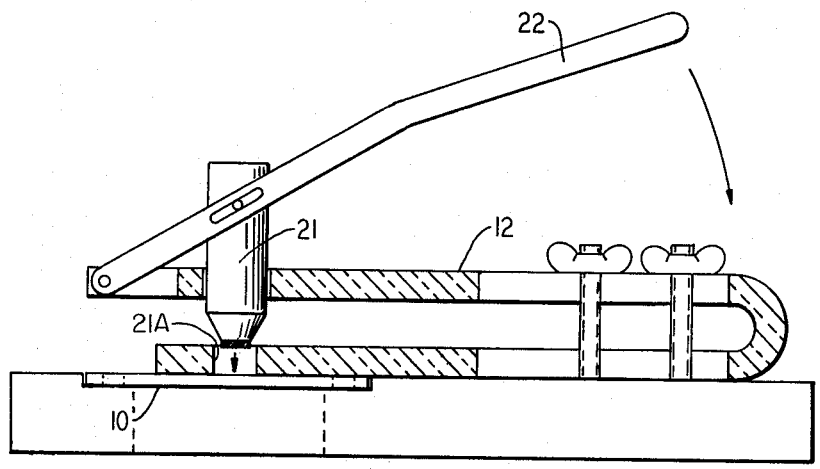

FIGS. 4 and 5 depict an alternate embodiment of the invention wherein cross-hair 16b is replaced by a container 21 which is filled with some suitable photo-opaque ink or dye. A lever arm 22 controls the container and when depressed thru the aperture 21A of member 12, deposits a suitably dimensioned dot 17A of paint on film 10. The operation of this embodiment is similar to that described with reference to FIG. 1. That is, cross-hair 16a is positioned over the target on upper frame-half 11a and lever 22 activated to deposit a dot of opaque paint 17A on the corresponding location on lower frame-half 11b. If the target is large, multiple paint dots, slightly overlapping, may be used. Then, the cross-hairs are moved to the next target or the film advanced to the next frame, as previously discussed.

FIGS. 6 and 7 depict another embodiment of the invention which is intended for use with color or black and white reversal film. With such film, the lower half of each frame is already opaque and the mask may be formed by selectively rendering portions thereof transparent. While the container 21 in FIGS. 4 and 5 can be filled with a bleach or acid to etch away the emulsion, it has been found preferable to mount a punch 31 to the member 12. Punch 31 is actuated by a lever 32 and forces a die 33 through aperture 31A of member 12 and clear through film 10; thus, forming the desired aperture 17C. As previously, if the target is large, a plurality of overlapping holes may be punched in the film. The punch is then moved to correspond to other targets in the frame, or the film advanced to the next frame, as before. The master film produced by this process can readily be contact printed to produce multiple release prints of high quality or, in the case of reversal films, duplicate copies can be made also of excellent quality.

One skilled in the art can make many changes and variations without departing from the spirit and scope of the invention. For example, the film can be illuminated from either the emulsion side or the non-emulsion side, etc.

What we claim is:

1. A device for operating upon a second unexposed portion of width w/2 of a film frame of length 1 and width w at a position thereon which corresponds to the position on a first scene-recorded portion of width w/2 and length 1 of said film frame at which a target appears comprising:

An elongated U-shaped member of optically transparent material having an upper portion and a lower portion and having the region adjacent the open end of said member positioned over a selected one of said film frames, said region of the upper portion of said member carrying a cross-hair adapted to be positioned over the target, a lever pivotally attached at the free end of said upper portion said lever carrying an element or portion of which has a reduced cross section juxtaposed with an aperture within said region of said lower portion aligned along the length of said film frame with the cross-hair on said upper portion, said element being centered at a distance from said cross-hair equal to the width w/2 of said portions of said film frames, and means for adjusting the position of said member until the cross-hair coincides with the target, said portion of reduced cross section of said element passing through the aperture in said lower portion and operating on the desired area of the second portion of each film frame in response to actuation of said lever.

2. A device according to claim 1 wherein said film is a negative film and said element contains an opaque medium which is applied to the second portion of said film frame during actuation of said lever.

3. A device according to claim 1 wherein said film is a reversed film and the portion of said element of reduced cross section penetrates the second portion of said film frame during actuation of said lever to form a transparent aperture therein.

* * * * *